(12) United States Patent
Dodge et al.

(10) Patent No.: US 9,762,595 B2
(45) Date of Patent: Sep. 12, 2017

(54) SECURE CROSS DOMAIN SOLUTION SYSTEMS AND METHODS

(71) Applicant: Raytheon Company, Waltham, MA (US)

(72) Inventors: Eric Dodge, Silver Spring, MD (US); Daniel E. Abramson, Fairfax, VA (US); Monty D. McDougal, St. Paul, TX (US); Julian A. Zottl, Springfield, VA (US); Stephen R. Welke, Fairfax, VA (US); Kevin L. Cariker, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 133 days.

(21) Appl. No.: 14/823,417

(22) Filed: Aug. 11, 2015

(65) Prior Publication Data
US 2017/0048259 A1    Feb. 16, 2017

(51) Int. Cl.
G06F 7/04     (2006.01)
G06F 15/16    (2006.01)
G06F 17/30    (2006.01)
H04L 29/06    (2006.01)

(52) U.S. Cl.
CPC ........ *H04L 63/1416* (2013.01); *H04L 63/105* (2013.01); *H04L 63/168* (2013.01)

(58) Field of Classification Search
CPC .................................................. H04L 63/1416
USPC ............................................................ 726/4
See application file for complete search history.

(56) References Cited

U.S. PATENT DOCUMENTS

| | | | | |
|---|---|---|---|---|
| 6,108,787 | A  * | 8/2000 | Anderson | G06F 21/606 709/249 |
| 7,467,399 | B2 * | 12/2008 | Nadalin | G06F 21/6209 380/28 |
| 7,926,086 | B1 * | 4/2011 | Violleau | G06F 21/629 713/161 |
| 8,739,270 | B1 * | 5/2014 | Arnold | H04L 63/105 370/352 |
| 9,191,391 | B1 * | 11/2015 | Stillerman | G06F 21/6218 |
| 2006/0047957 | A1 * | 3/2006 | Helms | G06F 21/10 713/165 |
| 2006/0080740 | A1 * | 4/2006 | Bremer | G06F 21/10 726/26 |

(Continued)

*Primary Examiner* — Dant Shaifer Harriman
(74) *Attorney, Agent, or Firm* — Schwegman Lundberg & Woessner, P.A.

(57) ABSTRACT

Generally discussed herein are systems, apparatuses, and methods for secure transfer of content across a security boundary. A system can include a high side domain communicatively coupled to a transfer guard module, the high side domain comprising a high side data repository, a first review module executable by processing circuitry to determine whether a permission level of first content violates a permission level of the high side domain, a second review module executable by the processing circuitry to determine whether second content from the high side data repository includes a permission level that violates a permission level of a low side domain, a first data diode module communicatively coupled between the first review module and the high side data repository, and a second data diode module communicatively coupled between the second review module and the high side data repository.

18 Claims, 3 Drawing Sheets

(56) References Cited

U.S. PATENT DOCUMENTS

| | | | |
|---|---|---|---|
| 2007/0220266 A1* | 9/2007 | Cooper | H04L 63/1416 713/176 |
| 2009/0165101 A1* | 6/2009 | Peterka | H04L 63/104 726/6 |
| 2010/0197246 A1* | 8/2010 | DeShazo | H04L 63/105 455/91 |
| 2011/0153969 A1* | 6/2011 | Petrick | G06F 21/606 711/163 |
| 2011/0162050 A1* | 6/2011 | Krajna | H04L 63/166 726/4 |
| 2011/0239276 A1* | 9/2011 | Garcia Garcia | H04L 63/102 726/4 |

* cited by examiner

SECURE CROSS DOMAIN SOLUTION SYSTEMS AND METHODS

TECHNICAL FIELD

Embodiments discussed herein generally relate to content security and malware protection. One or more embodiments relate more specifically to a cross domain service (CDS) architecture for managing and securing transfer of content into and out of a network.

BACKGROUND

In many instances, different networks and even different nodes of a network have different levels of security. Transferring content between the security boundaries without compromising security of either network or node or the content that is communicated therebetween can be difficult. Prevention of improper transfer of information through error or under the control of threat actors can broach information assurance controls or security. Transferring the content between security boundaries is one way that malware is transferred across security boundaries. Such malware can broach a higher security network or node.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to providing secure, assured, and/or automatic transfer of content (e.g., a file, application, script, or other computer content) between two different security domains. In one or more embodiments, the content is verified to be malware free, a valid transfer type, from a valid source, and/or to include a permissions level that does not violate a permissions level of an entity receiving the content. Only content that is inspected, verified, and originating from a permitted source is forwarded to the receiving entity. Erroneously routed content due to error, insufficient permissions or rights or through control of threat actors or their proxy processes is terminated. One or more embodiments can provide enhanced protection from: (a) errors in underlying components enabling improper information transfers, and/or (b) threat actors compromising single components and enabling covert transfers of information at domain boundaries.

Figure 1:
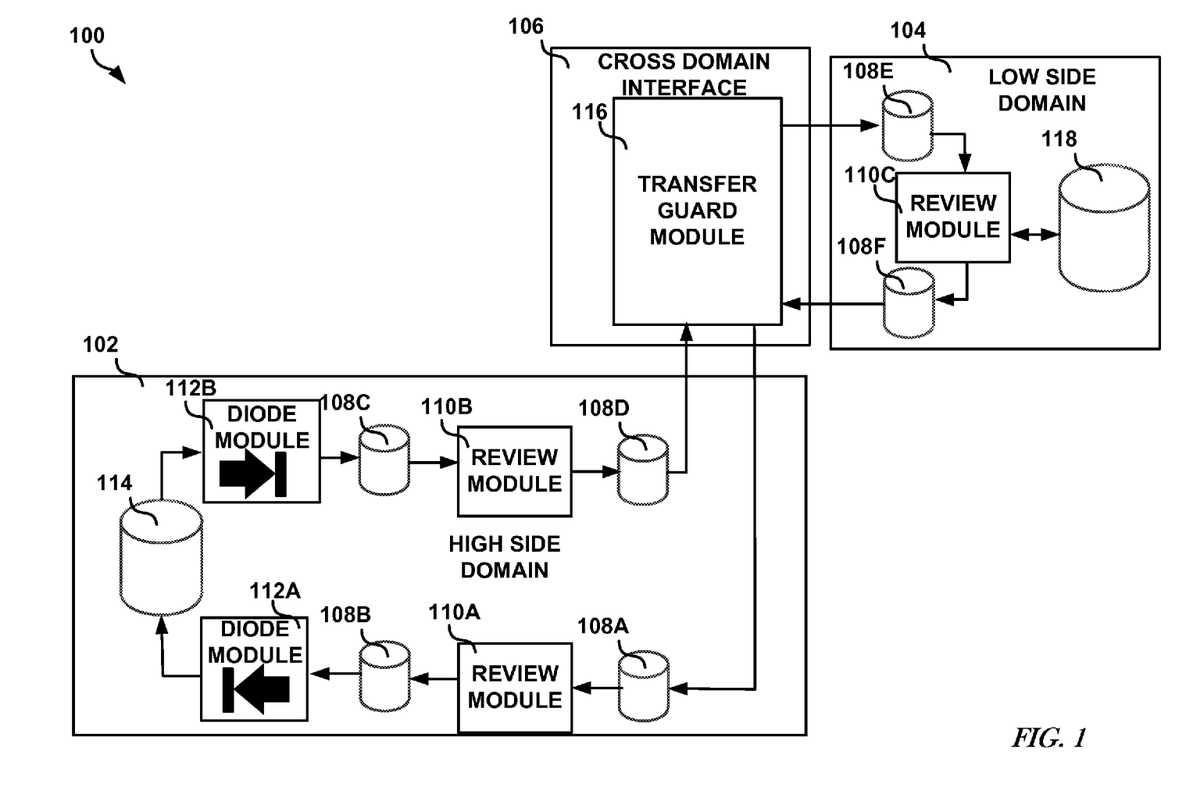
FIG. 1 illustrates, by way of example, a block diagram of an embodiment of a system.

FIG. 1 illustrates, by way of example, a block diagram of an embodiment of a system 100. The system 100 as illustrated includes a high side domain 102 communicatively coupled to a low side domain 104 through a cross domain interface 106. In the example of FIG. 1, the high side domain 102 provides a communication to the cross domain interface 106 which translates the communication to a communication protocol used by the low side system 104. The low side system 104 provides a communication to the cross domain interface 106 which translates the communication to a communication protocol used by the high side domain 102. The system 100 includes a transfer guard module 116 that implements two way file transfer protocols over Transmission Control Protocol/Internet Protocol (TCP/IP). The system 100 includes a the termination of these two way file transfers at the diode modules 112A-B, which can support one way transfer via User Datagram Protocol (UDP). The diode modules 112A-B prevent improper two way communications or covert exfiltration of content at the interface.

The high side domain 102 is a network domain hosting CDS system. The high side domain can include a large or small IT network domain. The high side domain 102 can include a higher permissions and trust level (e.g., a more secure network infrastructure, higher level of content clearance, and/or higher level of security requirements) than the low side domain 104. The high side domain 102 as illustrated includes a plurality of data stores 108A, 108B, 108C, and 108D, a first review module 110A, a second review module 110B, a first data diode module 112A, a second data diode module 112B, and one or more high side data repositories 114. High side domain sender or receiver processes consume or provide data for transfer into the data repositories 114. Similarly Low side network domain senders or receivers (not shown) consume or provide data for transfer into the data repositories 118. The low side system 104 is a network that has a lower permissions and trust level (e.g., a less secure network infrastructure, lower level of content clearance, and/or lower level of security requirements) than the high side domain 102. The low side domain 104 as illustrated includes a plurality of data stores 108E and 108F, a third review module 110F, and one or more low side data repositories 118.

The data stores 108A-F each store content for a respective component with which they are communicatively coupled. The data store 108A-F can be disk storage, or a volatile or non-volatile random access memory (RAM) enabled file store and is configured for private access between the items in the system 100. Exceptions include the high side data repository 114 and low side data repository 118 through which data senders and receivers stage or receive files processed (securely) by the system 100. The data store 108A-F can consist of any commercial storage enabling a first in first out (FIFO) or non-sequential access to file content received for processing.

The data store 108A is communicatively coupled between the cross domain interface 106 and the review module 110A to store content (e.g., temporarily store content) from the cross domain interface 106 being sent to the review module 110A. The data store 108B is communicatively coupled between the review module 110A and the data diode module 112A to store content from review module 110A being sent to the data diode module 112A. The data diode module 112A allows transfer in one direction (e.g., only one direction) and prevents erroneous or surreptitious transfers back to the review module 110A or to the transfer guard module 116. The content stored in the data store 108B can include only content that is determined, by the review module 110A, to include a permissions level that does not violate the security trust of the transfer from low to high (screened) and/or to be free of malware, viruses or other improper content. The review module 110A can provide the option for human review of any transfer violations or unknown or unexpected content.

The data store 108C is communicatively coupled between the one or more high side data repositories 114 and the data diode module 112B to store content from the one or more repositories 114 being sent to the data diode module 112B. The data store 108C is communicatively coupled between the one or more high side data repositories 114 and the data diode module 112B to store content from the one or more repositories 114 being sent to the data diode module 112B. The data store 108D is communicatively coupled between the cross domain interface 106 and the review module 110B to store content from the cross domain interface 106 being sent to the review module 110A. The content stored in the data store 108D can include only content that is determined, by the review module 110B, to include a permissions level that does not violate the permissions level of the low side domain 104 and/or to be free of malware.

The review modules 110A-C implement policies (e.g., automatically or with human review) that either allow transfer of content towards the repositories 114 or 118 or reject transfer of content. The review modules 110A-C can include a commercial or custom file scanning workflow enabling file inspection (e.g., inspection for malware, permissions, and/or transfer violations). The review modules 110A-C can provide an interface for human review of errors that are flagged in an automatic review and/or human review for malware, permission, and/or transfer violations. The policy can include a content type filter (e.g., allow or prohibit ".pdf", ".doc" or variations thereof, ".xls", ".ppt" or variations thereof, ".txt", ".dmg", ".exe", or other file type), a rule based filter, such as can include allowing or prohibiting content including an embedded script, 'dirty word' scans, or content markings that would violate specified permissions or trust levels for the target domain. The review modules 110A-C can include a malware detection, virus checking and content inspection system that can include an automatic (e.g., without human interference after deployment) analysis and/or a human analysis. In one or more embodiments, the review modules 110A-C implement the same one or more policies, while in other embodiments, the review modules 110A-C implement a different one or more policies. The review modules 110A-C provide protections against cascade of similar errors, failures in rules or scanning engines, or errors in code from one module type to another and enhances the effectiveness of the total cross domain transfer from high to low, or low to high.

A human review can include content to be reviewed being presented to a person and the person providing input to the review module 110A-C that indicates whether the content is allowed or prohibited. The person can follow a predetermined set of rules in determining whether the content is approved or denied. If the input from the person indicates the content is prohibited it can be removed from the review module 110A-C and any data store 108A-F that may include that content stored thereon. Content that fails automatic and/or human inspection is blocked from further transfer unless enabled by human review. Failed content can be quarantined and logged. If the input indicates the content is allowed, the content can be provided to the data store 108B, 108D, or 108F for access by the diode module 112A, the cross domain interface 106, or the transfer guard module 116, respectively. The human review help ensure that content to remain confidential remains confidential and/or that content that includes malware is prohibited from being sent to the high side domain 102 or the low side domain 104.

An automatic review can include a processor accessing instructions stored on a memory that cause the processor to perform an analysis of the content. The output of the analysis can include a signal that indicates whether the content is allowed or prohibited. The analysis can include performing a heuristic, signature, behavioral, and/or a hash analysis on the content to be downloaded.

A signature analysis includes determining if content includes a specific bit or byte pattern. For example, the bit sequence "1100110011001100" can be associated with malware. The review module 110A-C can determine if the content includes that bit sequence, and if it is not detected, the review module 110A-C can determine that the content does not include malware based on the signature analysis.

A heuristic analysis is a method of detecting a variant of known malware or a new type of malware. As malware mutates or is changed (e.g., to attack a different system type or to get through malware detection software) the code or signature of the malware changes. Families of malware, however, retain commonalities with other malware in the family. These commonalities can be detected by creating a single signature that encapsulates the similarities between the malware in the family with one or more non-contiguous code identifiers (e.g., wild card characters) where differences between members of the malware family occur. A malware detection scheme can thus detect if content is a member of the family regardless of differing code inserted in place of the wild card(s).

A fuzzy hash analysis includes determining a plurality of hash values (e.g., a checksum, and MD5 hash, an SHA1 hash, or other hash) on portions of the contents and/or metadata of the file and comparing the determined hash value(s) to hash values of a document known to be malware. If a specified number or percentage of the determined hash value(s) matches hash values of a file known to be malware, the file can be determined to include malware. Fuzzy hash analysis can include hashing content of a file in a sliding window or in blocks.

A behavioral analysis includes executing commands of content, such as in an isolated (e.g., virtual) environment and monitoring the commands as they are performed. If the commands performed exhibit typical malware type behavior(s), the content can be considered malware.

A permissions analysis includes comparing a permissions level associated with content to a permissions level of an entity to receive the content. A permissions level of content indicates a relative sensitivity of the content with which the permissions level is associated. For example, a "top secret" permissions level indicates that the content is very sensitive and is to be provided to only entities with a top secret or higher clearance permissions level. If the entity (e.g., the low side domain or the high side domain) includes a permissions level of "top secret" or higher, the entity is authorized to receive the content. If the entity includes permission level of "classified", the entity is not authorized to receive the content (i.e. the permissions level of the content violates the permissions level of the entity). While this example includes "top secret" and "classified" as examples of permissions levels, many other permissions level designations can be used. For example, a numerical hierarchy of permission levels (e.g., numbers one through ten can indicate relative permissions with either one or ten being a highest permission level and ten or one being a lowest permission level), or other permission level scheme can be employed.

The review module 110A-C performs a permissions analysis, a malware analysis, anti-virus scan, or a combination thereof. The analysis can be performed automatically (e.g., using a machine executing instructions which, when executed by the machine, configure the machine to perform operations), with human review, or a combination thereof. The review module 110A-C can remove the entire content that includes the malware or potential malware or remove only the portion of the content that is associated with malware or potential malware and forward the remainder of the content, or can forward the entire content based on the analysis, whether human, automatic, or a combination thereof. The review module 110A-C can remove the entire content if at least a portion of the content includes a permissions level that violates the permissions level of the entity, remove only the portion of the content that includes a permission level that violates a permission level of the entity to receive the content, or can forward the entire content based on the permission analysis, whether human, automatic, or a combination thereof.

The content (e.g., in the repository 114) of the high side domain 102 can be subject more stringent malware, confidentiality, or other security restrictions, thus the content of the high side domain 102 is generally already vetted for security (e.g., permissions levels and malware). In one or more embodiments, the review module 110A implements a malware analysis technique without concern for the secrecy or confidentiality level of the content being transmitted and the review module 110B implements a secrecy or confidentiality level filter without concern for whether content includes malware.

The data diode module 112A-B is a device that allows content to travel in only one direction. The data diode module 112A permits content to travel to, and not from, the high side domain 102. The data diode module 112B allows content to travel to, and not from, the low side domain 104. The data diode module 112A-B supports separation of transfer security concerns between high to low and low to high, while providing for covert or erroneous communications channel protections. An example of a simple data diode module includes a modified fiber optic cable with a send device removed from one end and a transmit device removed from the other end. Other data diodes are commercially available and generally include different architectures, such as can include a data diode module from Owl Computing Technologies of Ridgefield, Conn., U.S.A., Fox-IT of Delft, The Netherlands, Tresys Technology LLC of Columbia, Md., U.S.A., Advenica of Lund, Sweden, of VADO security of Petach Tikva, Israel, among others.

The cross domain interface 106 can translate communications between the high side domain 102 and the low side domain 104. The cross domain interface 106 allows for approved transfer of content from the low side domain 104 to the high side domain 102 and vice versa. The translation can include converting between transmission protocols carrying the content and/or regenerating the transfer protocol to the next destination. The cross domain interface 106 is essentially composed of a two way file transfer guard as illustrated includes a transfer guard module 116. The transfer guard module 116 provides an interface between the security levels implemented on the high side domain 102 and the low side domain 104. The transfer guard module 116 can include separation of scanning and validation of content. The transfer guard module 116 includes a network interface for the low side domain 104 and a network interface for the high side domain 102. The transfer guard module 116 can include a commercial or custom two way cross domain file transfer guard providing malware inspection, deep content inspection, and/or separation of domain controls. For content travelling from the high side domain 102 to the low side domain 104, the transfer guard module 116 ensures that the permissions level (e.g., security level, confidentiality level, and/or secrecy level) of the content does not violate the permission level of the low side domain 104. For example, if the low side domain 104 has a permission level of "unclassified", then the transfer guard module 116 blocks any content that is "classified", "secret", and/or "top secret".

The low side domain 104 as illustrated includes data stores 108E and 108F, the review module 110C, and the low side data repository 118. The data store 108E is communicatively coupled between the transfer guard module 116 and the review module 110C to store content (e.g., temporarily) from the high side domain 102 that is determined by the transfer guard module 116 to not violate the permissions level of the low side domain 104. The data store 108F is communicatively coupled between the review module 110C and the transfer guard module 116 to store (e.g., temporarily) content that is determined by the review module 110C to either not include malware, anti-virus and/or violate a permission level of the high side domain 102. The transfer guard module 116 can access content from the data store 110F and/or the data store 108D. The accessed content can be removed from the respective data store 108A-F in response to the content being accessed for successful transfer or rejected/quarantined for a detected violation.

The review modules 110A-C and the transfer guard module 116 in combination provide a redundancy for a malware and/or permissions level analysis, as well as solution diversity and defense in depth. If one or more of the review modules 110A-C and the transfer guard module 116 becomes compromised (e.g., by malware or other means) the other review modules 110A-C and/or the transfer guard module 116 are able to perform the operations of the compromised device so as to help ensure that confidential content remains confidential and/or that the high side domain 102 and the low side domain 104 are protected from malware. The data diodes 112A-B help prevent malware from affecting a component upstream from the data diode module 112A-B, such as by preventing content from travelling in the upstream direction.

Figure 2:
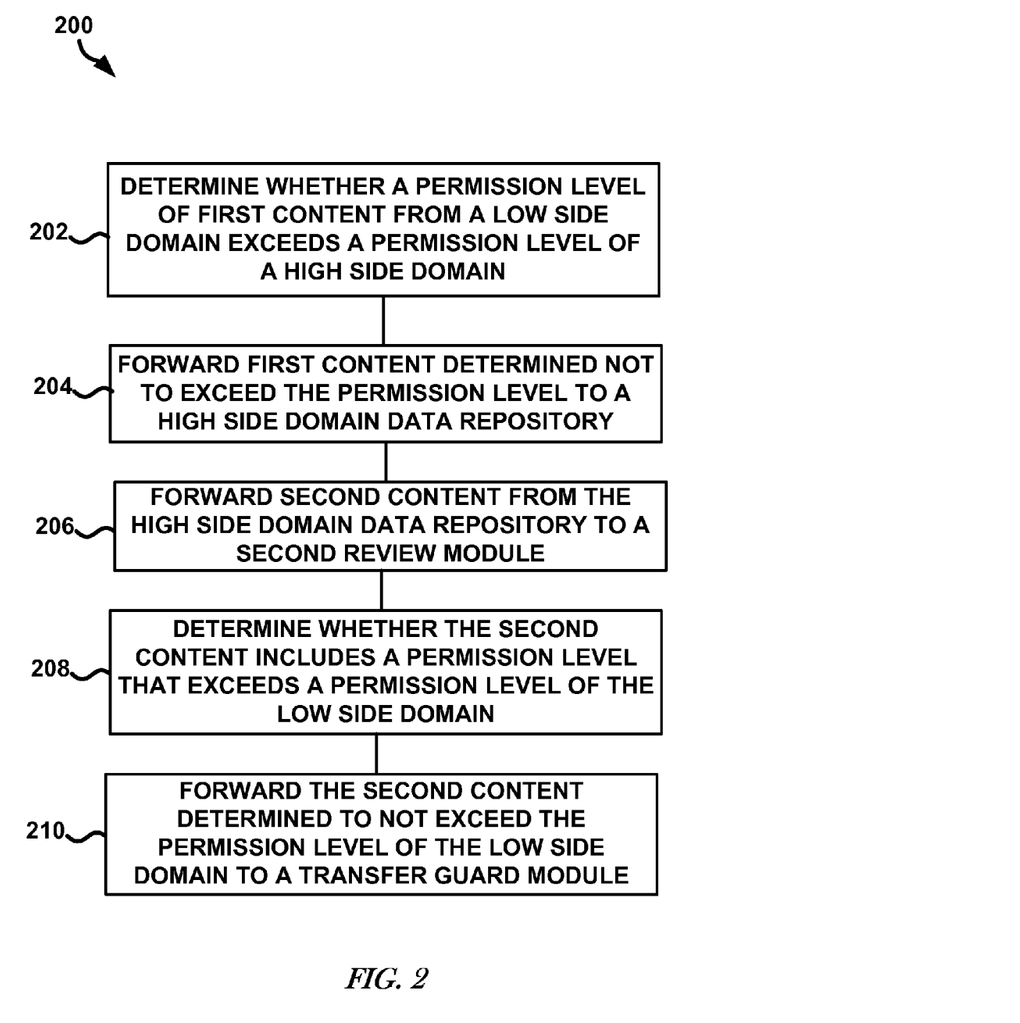
FIG. 2 illustrates, by way of example, an embodiment of a method for a secure cross domain solution (CDS).

FIG. 2 illustrates, by way of example, an embodiment of a method 200 for a secure cross domain solution (CDS). The method 200 regards a content transfer from a low side domain to a high side domain, but can additionally or alternatively include a content transfer from the high side domain to the low side domain The method 200 as illustrated includes determining whether a permission level of first content from a data repository of a low side domain violates a permission level of a high side domain, at operation 202. The operation at 202 can be performed by the review module 110A and/or the transfer guard module 116. The operation at 202 can additionally or alternatively include determining if the content includes improper content (e.g., virus, malware, unknown format, etc.).

At operation 204, the first content determined not to violate the permission level of the high side domain is forwarded to a data store of a high side domain. The operation at 204 can be performed by the data diode module 112A. At operation 206 second content from the high side domain repository can be forwarded to a second review module. The data diode module 112B can perform the operation 206.

At operation 208, it can be determined whether the second content includes a permission level that violates a permission level of the low side domain. The operation at 208 can be performed by the review module 110B. At operation 210, second content determined to not violate the permission level of the low side domain to the transfer guard module.

The method 200 can further include determining (e.g., using the transfer guard module 116), whether the second content includes a permission level that violates a permission level of the low side domain, contains an improper content type, or includes improper content, such as can include content with an unknown content type, a virus, malware, or other. The method 200 can further include, in response to determining the second content does not include a permission level that violates the permission level of the low side domain, forwarding the second content to the low side domain The method 200 can further include, in response to determining the second content does include a permission level that violates the permission level of the low side domain, prohibiting the second content from being sent to the low side domain.

The method 200 can further include, prior to determining whether the permission level of the first content violates the permission level of the high side domain, determining (e.g., using the transfer guard module 116) whether a permission level of the first content violates a permission level of the high side domain. The method 200 can further include, in response to determining the permission level of the first content violates the permission level of the high side domain, prohibiting (e.g., using the transfer guard module 116) the first content from being provided to the high side domain. The method 200 can further include, in response to determining the permission level of the first content does not violate the permission level of the high side domain, providing the first content to the high side domain.

The method 200 can further include storing the first content in a first data store (e.g., the data store 108A) communicatively coupled between the first review module and the transfer guard module. The method 200 can further include storing the first content determined to not violate the permission level of the high side domain in a second data store (e.g., the data store 108B) communicatively coupled between the first review module and the first data diode. The method 200 can further include storing the second content (e.g., content from the high side data repository 114) in a third data store (e.g., the data store 108C) communicatively coupled between the first data diode module and the second review module. The method 200 can further include storing the second content determined to include a permission level that does not violate the permission level of the low side domain (e.g., by the review module 110B) in a fourth data store (e.g., the data store 108D) communicatively coupled between the second review module and the transfer guard module.

The method 200 can further include performing, using a third review module of a low side domain (e.g., the review module 110C), a malware analysis, anti-virus, deep content inspection, and/or a permission analysis on second content from the transfer guard module. The second content from the transfer guard module can be determined (by the transfer guard module) to include a permission level that does not violate the permission level of the low side domain. The method 200 can further include determining, using a third review module of a low side domain, whether a permission level of the first content from a repository of the low side domain violates a permission level of the high side domain.

The method 200 can further include storing, in a fifth data store (e.g., the data store 108E) communicatively coupled between the third review module and the transfer guard module, the first content determined to not violate the permission level of the high side domain. The method 200 can further include storing, in a sixth data store (e.g., the data store 108F) communicatively coupled between the third review module and the transfer guard module, first content from the data repository of the low side domain.

Figure 3:
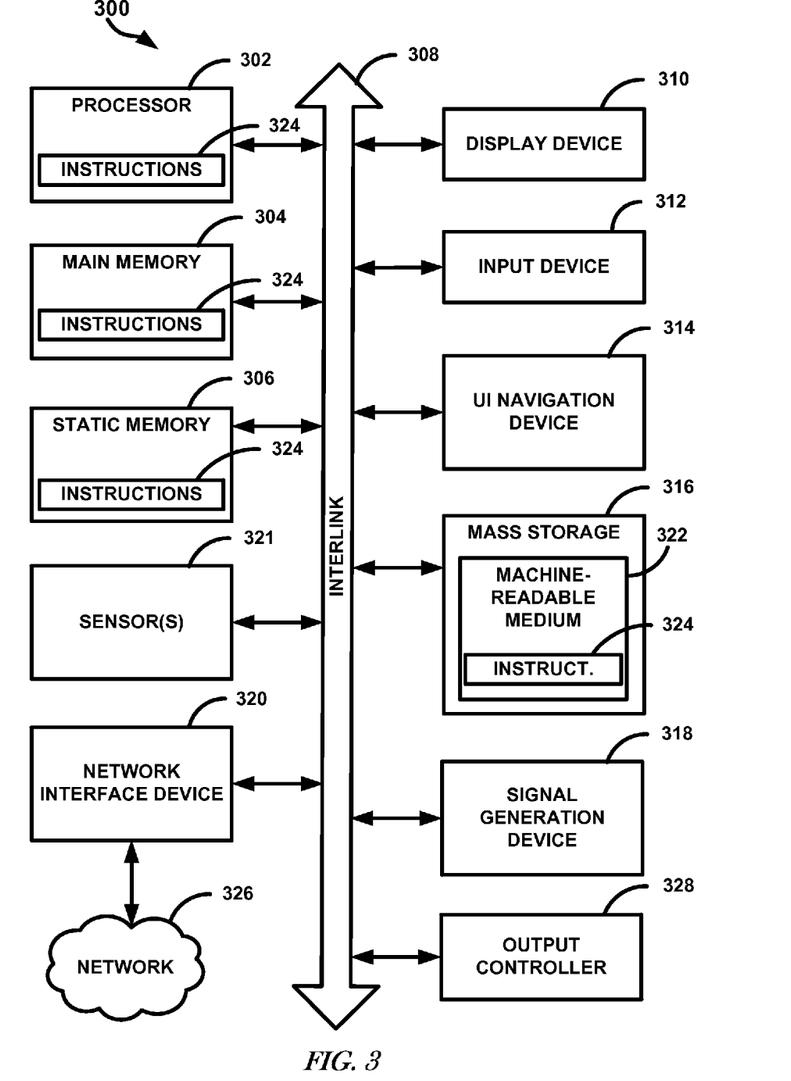
FIG. 3 illustrates, by way of example, a block diagram of an embodiment of a machine (e.g., a computing device) on which one or more of the methods as discussed herein can be implemented.

FIG. 3 illustrates, by way of example, a block diagram of an embodiment of a machine 300 on which one or more of the methods as discussed herein can be implemented. The machine 300 can include a computing device commercially instantiated as a compute device or server. The machine 300 may be employed to host review module workflow scanning processes, tools, and/or software that is commercial or custom. The machine 300 may be used to host one or more transfer guard module processes or software; although many transfer guard modules include specialized hardware. Similarly, variants of diode modules may be instantiated as software processes hosted on respective machines, such as can be similar to the machine 300, with one set of processes on 'blue' (low) side of a diode module on one machine and one set of processes on 'red' (high) side of a diode module on second machine. The respective machines can include a diode card interface implementation between them. Note that some commercial devices come in a specialized appliance form containing the diode interface and dual machines. One or more of the review module 110A, 110B, and 110C, the data diode module 112A and 112B, and the transfer guard module 116 can include one or more of the items of the machine 300. The review module 110A, 110B, and 110C, the data diode module 112A and 112B, and/or the transfer guard module 116 can be implemented by the machine 300. In alternative embodiments, the machine 300 operates as a standalone device or may be connected (e.g., networked) to other machines. In a networked deployment, the machine 300 may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The machine 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of well-known transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

EXAMPLES AND ADDITIONAL NOTES

Example 1 can include or use subject matter (such as an apparatus, a method, a means for performing operations, or a machine readable memory including instructions that, when performed by the machine, can configure the machine to perform acts), such as can include or use a high side data repository, a first review module executable by processing circuitry (e.g., a processor and/or electric or electronic components, such as a resistor, capacitor, inductor, logic gates, transistors, multiplexers, or the like) to determine whether a permission level of first content violates a permission level of the high side domain, a second review module executable by the processing circuitry to determine whether second content from the high side data repository includes a permission level that violates a permission level of a low side domain, a first data diode module communicatively coupled between the first review module and the high side data repository, the first data diode module to permit content to travel (e.g., only) towards the high side data repository, and/or a second data diode module communicatively coupled between the second review module and the high side data repository, the second data diode module to permit content to travel (e.g., only) away from the high side data repository.

Example 2 can include or use, or can optionally be combined with the subject matter of Example 1, to include or use, wherein the transfer guard module is communicatively coupled between the high side domain and the low side domain and the transfer guard module is to determine whether the second content includes a permission level that violates a permission level of the low side domain, in response to determining the second content does not include a permission level that violates the permission level of the low side domain, provide the second content to the low side domain, and in response to determining the second content includes a permission level that violates the permission level of the low side domain, prohibit the second content from being provided to the low side domain.

Example 3 can include or use, or can optionally be combined with the subject matter of at least one of Examples 1-2, to include or use, wherein the transfer guard module is communicatively coupled between the high side domain and the low side domain and the transfer guard module is to determine whether the second content includes a permission level that violates a permission level of the low side domain, in response to determining the second content does not include a permission level that violates the permission level of the low side domain, provide the second content to the low side domain, and in response to determining the second content includes a permission level that violates the permission level of the low side domain, prohibit the second content from being provided to the low side domain.

Example 4 can include or use, or can optionally be combined with the subject matter of at least one of Examples 1-3, to include or use a first data store communicatively coupled between the first review module and the transfer guard module to store the first content thereon.

Example 5 can include or use, or can optionally be combined with the subject matter of at least one of Examples 1-4, to include or use a second data store communicatively coupled between the first review module and the first data diode module to store first content determined, by the first review module, to not violate the permission level of the high side domain.

Example 6 can include or use, or can optionally be combined with the subject matter of at least one of Examples 1-5, to include or use a third data store communicatively coupled between the first data diode module and the second review module, the third data store stores the second content.

Example 7 can include or use, or can optionally be combined with the subject matter of at least one of Examples 1-6, to include or use a fourth data store communicatively coupled between the second review module and the transfer guard module to store the second content determined to not violate the permission level of the low side domain by the second review module.

Example 8 can include or use, or can optionally be combined with the subject matter of at least one of Examples 1-7, to include or use, wherein the low side domain is communicatively coupled to the high side domain through the transfer guard module, the low side domain comprising a third review module that determines whether a permission level of the second content from the transfer guard module violates the permission level of the low side domain.

Example 9 can include or use, or can optionally be combined with the subject matter of Example 8, to include or use, wherein the low side domain includes a low side data repository communicatively coupled to the third review module, and the third review module determines whether a permission level of the first content from the low side data repository violates a permission level of the high side domain.

Example 10 can include or use, or can optionally be combined with the subject matter of Example 9, to include or use, wherein the low side domain further comprises a fifth data store communicatively coupled between the transfer guard module and the third review module to store the second content from the transfer guard module, and a sixth data store communicatively coupled between the third review module and the transfer guard module to store content from the third review module determined to include a permission level that does not violate the permission level of the high side domain.

Example 11 can include or use subject matter (such as an apparatus, a method, a means for performing operations, or a machine readable memory including instructions that, when performed by the machine, can configure the machine to perform operations), such as can include or use determining, using a first review module executing using processing circuitry, whether a permission level of first content from a low side domain violates a permission level of a high side domain, forwarding, using a first data diode module that permits content to flow in only one direction, first content determined to not violate the permission level to a high side data repository, forwarding, using a second data diode module that permits content to flow in only one direction, second content from the high side data repository to a second review module, determining, using the second review module, whether the second content includes a permission level that violates a permission level of the low side domain, and forwarding the second content to a transfer guard module in response to determining the permission level of the second content does not violate a permission level of the low side domain.

Example 12 can include or use, or can optionally be combined with the subject matter of Example 11, to include or use determining, using the transfer guard module, whether the second content includes a permission level that violates a permission level of the low side domain, in response to determining the second content does not include a permission level that violates the permission level of the low side domain, forwarding the second content to the low side domain, and in response to determining the second content includes a permission level that violates the permission level of the low side domain, prohibiting the second content from being sent to the low side domain.

Example 13 can include or use, or can optionally be combined with the subject matter of at least one of Examples 11-12, to include or use, prior to determining whether the permission level of the first content violates the permission level of the high side domain, determining, using the transfer guard module, whether a permission level of the first content violates a permission level of the high side domain, in response to determining the permission level of the first content violates the permission level of the high side domain, prohibiting the first content from being provided to the high side domain, and in response to determining the permission level of the first content does not violate the permission level of the high side domain, providing the first content to the high side domain.

Example 14 can include or use, or can optionally be combined with the subject matter of at least one of Examples 11-13, to include or use, storing the first content in a first data store communicatively coupled between the first review module and the transfer guard module.

Example 15 can include or use, or can optionally be combined with the subject matter of at least one of Examples 11-14, to include or use, storing the first content determined to not violate the permission level of the high side domain in a second data store communicatively coupled between the first review module and the first data diode.

Example 16 can include or use, or can optionally be combined with the subject matter of at least one of Examples 11-15, to include or use storing the second content in a third data store communicatively coupled between the first data diode module and the second review module.

Example 17 can include or use, or can optionally be combined with the subject matter of at least one of Examples 11-16, to include or use storing the second data determined to include a permission level that does not violate the permission level of the low side domain in a fourth data store communicatively coupled between the second review module and the transfer guard module.

Example 18 can include or use, or can optionally be combined with the subject matter of at least one of Examples 11-17, to include or use performing, using a third review module of a low side domain, a malware analysis or a permission verification on the second content from the transfer guard module.

Example 19 can include or use, or can optionally be combined with the subject matter of at least one of Examples 11-18, to include or use determining, using a third review module of a low side domain, whether a permission level of the first content from a low side data repository of the low side domain violates a permission level of the high side domain.

Example 20 can include or use, or can optionally be combined with the subject matter of Example 19, to include or use storing, in a fifth data store communicatively coupled between the third review module and the transfer guard module, the first content determined to not violate the permission level of the high side domain.

Example 21 can include or use subject matter (such as an apparatus, a method, a means for performing operations, or a machine readable memory including instructions that, when performed by the machine, can configure the machine to perform operations), such as can include or use a high side domain including a first permissions level, a low side domain including a second permissions level lower than the first permissions level, and a cross domain interface communicatively coupled between the high side domain and the low side domain to translate communications between the high side domain and the low side domain, the cross domain interface including a transfer guard module, executable by processing circuitry, that verifies whether a permissions level of first content from the high side domain violates the second permissions level and a permissions level of second content from the low side domain violates the first permissions level. The high side domain can include a high side data repository to store the first content, a first review module, executable by processing circuitry, that determines whether a permissions level of the second content violates the second permissions level, a second review module, executable by the processing circuitry, that determines whether second content from the high side data repository includes a permission level that violates a permission level of a low side domain, a first data diode module communicatively coupled between the first review module and the high side data repository, the first data diode module permits the second content to travel only to the high side data repository, and a second data diode module communicatively coupled between the second review module and the high side data repository, the second data diode module permits the first content to travel only away from the high side data repository. The low side domain can include a low side data repository that stores the second content, and a third review module, executable by processing circuitry and communicatively coupled between the transfer guard module and the low side data repository, that determines whether a permissions level of the second content violates the second permissions level and whether the permissions level of the first content violates the first permissions level.

Example 22 can include or use, or can optionally be combined with the subject matter of Example 21, to include or use, wherein the high side domain further comprises a first data store communicatively coupled between the first review module and the transfer guard module to store the first data thereon, a second data store communicatively coupled between the first review module and the first data diode module to store first content determined, by the first review module, to not violate the permission level of the high side domain, a third data store communicatively coupled between the first data diode module and the second review module, the third data store stores the second content, and a fourth data store communicatively coupled between the second review module and the transfer guard module to store the second content determined to not violate the permission level of the low side domain by the second review module.

Example 22 can include or use, or can optionally be combined with the subject matter of at least one of Examples 21-22, to include or use, wherein the low side domain further comprises a fifth data store communicatively coupled between the transfer guard module and the third review module to store the second content from the transfer guard module, and a sixth data store communicatively coupled between the third review module and the transfer guard module to store content from the third review module determined to include a permission level that does not violate the permission level of the high side domain.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   a high side domain comprising:
   a high side data repository;
   a first review module executed by processing circuitry to determine whether a permission level of first content violates a permission level of the high side domain;
   a second review module executed by the processing circuitry to determine whether second content from the high side data repository includes a permission level that violates a permission level of a low side domain;
   a first data diode communicatively coupled between the first review module and the high side data repository, the first data diode to permit content to travel towards the high side data repository; and
   a second data diode communicatively coupled between the second review module and the high side data repository, the second data diode to permit content to travel away from the high side data repository; and
   a transfer guard module, communicatively coupled between the high side domain and the low side domain, the transfer guard module executed by second processing circuitry to:
   determine whether the second content includes a permission level that violates a permission level of the low side domain,
   in response to a determination that the second content does not include a permission level that violates the permission level of the low side domain, provide the second content to the low side domain, and
   in response to a determination that the second content includes a permission level that violates the permission level of the low side domain, prohibit the second content from being provided to the low side domain.

2. The system of claim 1, wherein the transfer guard module is communicatively coupled between the high side domain and the low side domain and the transfer guard module is executed by second processing circuitry further to:
   determine whether a permission level of the first content violates a permission level of the high side domain;
   in response to determining the permission level of the first content violates the permission level of the high side domain, prohibit the first content from being provided to the high side domain; and
   in response to determining the permission level of the first content does not violate the permission level of the high side domain, provide the first content to the high side domain.

3. The system of claim 1, further comprising:
   a transfer guard module communicatively coupled between the high side domain and the low side domain; and
   a first data store communicatively coupled between the first review module and the transfer guard module to store the first content thereon.

4. The system of claim 3, further comprising a second data store communicatively coupled between the first review module and the first data diode to store first content determined, by the first review module, to not violate the permission level of the high side domain.

5. The system of claim 4, further comprising a third data store communicatively coupled between the first data diode and the second review module, the third data store stores the second content.

6. The system of claim 5, further comprising a fourth data store communicatively coupled between the second review module and the transfer guard module to store the second content determined to not violate the permission level of the low side domain by the second review module.

7. The system of claim 1, further comprising a low side domain communicatively coupled to the high side domain through the transfer guard module, the low side domain comprising:
   a third review module that determines whether a permission level of the second content from the transfer guard module violates the permission level of the low side domain.

8. The system of claim 7, wherein:
   the low side domain includes a low side data repository communicatively coupled to the third review module; and the third review module determines whether a permission level of the first content from the low side data repository violates a permission level of the high side domain.

9. The system of claim 8, wherein the low side domain further comprises:
a fifth data store communicatively coupled between the transfer guard module and the third review module to store the second content from the transfer guard module; and
a sixth data store communicatively coupled between the third review module and the transfer guard module to store content from the third review module determined to include a permission level that does not violate the permission level of the high side domain.

10. A method comprising:
determining, using a first review module executing using processing circuitry, whether a permission level of first content from a low side domain violates a permission level of a high side domain;
forwarding, using a first data diode that permits content to flow in only one direction, first content determined to not violate the permission level to a high side data repository;
forwarding, using a second data diode that permits content to flow in only one direction, second content from the high side data repository to a second review module;
determining, using a second review module executing using the processing circuitry, whether the second content includes a permission level that violates a permission level of the low side domain;
forwarding the second content to a transfer guard module executing using second processing circuitry in response to determining the permission level of the second content does not violate a permission level of the low side domain;
prior to determining whether the permission level of the first content violates the permission level of the high side domain, determining, using the transfer guard module, whether a permission level of the first content violates a permission level of the high side domain;
in response to determining the permission level of the first content violates the permission level of the high side domain, prohibiting the first content from being provided to the high side domain; and
in response to determining the permission level of the first content does not violate the permission level of the high side domain, the first content to the high side domain.

11. The method of claim 10, further comprising:
determining, using the transfer guard module, whether the second content includes a permission level that violates a permission level of the low side domain;
in response to determining the second content does not include a permission level that violates the permission level of the low side domain, forwarding the second content to the low side domain; and
in response to determining the second content includes a permission level that violates the permission level of the low side domain, prohibiting the second content from being sent to the low side domain.

12. The method of claim 10, further comprising:
storing the first content in a first data store communicatively coupled between the first review module and the transfer guard module.

13. The method of claim 10, further comprising:
storing the first content determined to not violate the permission level of the high side domain in a second data store communicatively coupled between the first review module and the first data diode.

14. The method of claim 10, further comprising:
storing the second content in a third data store communicatively coupled between the first data diode and the second review module.

15. The method of claim 10, further comprising:
storing the second data determined to include a permission level that does not violate the permission level of the low side domain in a fourth data store communicatively coupled between the second review module and the transfer guard module.

16. A system comprising:
a high side domain including a first permissions level;
a low side domain including a second permissions level lower than the first permissions level; and
processing circuitry to implement a cross domain interface communicatively coupled between the high side domain and the low side domain to translate communications between the high side domain and the low side domain, the cross domain interface including a transfer guard module, executed by the processing circuitry, that verifies whether a permissions level of first content from the high side domain violates the second permissions level and a permissions level of second content from the low side domain violates the first permissions level;
wherein the high side domain includes:
a high side data repository to store the first content;
a first review module, executed by second processing circuitry, that determines whether a permissions level of the second content violates the second permissions level;
a second review module, executed by the second processing circuitry, that determines whether second content from the high side data repository includes a permission level that violates a permission level of a low side domain;
a first data diode communicatively coupled between the first review module and the high side data repository, the first data diode permits the second content to travel only to the high side data repository; and
a second data diode communicatively coupled between the second review module and the high side data repository, the second data diode permits the first content to travel only away from the high side data repository, and
wherein the low side domain includes:
a low side data repository that stores the second content; and
a third review module, executed by third processing circuitry and communicatively coupled between the transfer guard module and the low side data repository, that determines whether a permissions level of the second content violates the second permissions level and whether the permissions level of the first content violates the first permissions level.

17. The system of claim 16, wherein the high side domain further comprises:
a first data store communicatively coupled between the first review module and the transfer guard module to store the first data thereon;
a second data store communicatively coupled between the first review module and the first data diode to store first content determined, by the first review module, to not violate the permission level of the high side domain;

a third data store communicatively coupled between the first data diode and the second review module, the third data store stores the second content; and a fourth data store communicatively coupled between the second review module and the transfer guard module to store the second content determined to not violate the permission level of the low side domain by the second review module.

18. The system of claim 17, wherein the low side domain further comprises:

a fifth data store communicatively coupled between the transfer guard module and the third review module to store the second content from the transfer guard module; and a sixth data store communicatively coupled between the third review module and the transfer guard module to store content from the third review module determined to include a permission level that does not violate the permission level of the high side domain.

* * * * *

UNITED STATES PATENT AND TRADEMARK OFFICE
CERTIFICATE OF CORRECTION

PATENT NO. : 9,762,595 B2
APPLICATION NO. : 14/823417
DATED : September 12, 2017
INVENTOR(S) : Dodge et al.

Page 1 of 1

It is certified that error appears in the above-identified patent and that said Letters Patent is hereby corrected as shown below:

In the Specification

In Column 2, Line 3, delete "system" and insert --domain-- therefor

In Column 2, Line 4, delete "system" and insert --domain-- therefor

In Column 2, Line 31, delete "system" and insert --domain-- therefor

In Column 2, Line 38, delete "110F," and insert --110C,-- therefor

In Column 6, Line 23, delete "110F" and insert --108F-- therefor

In the Claims

In Column 15, Line 48, in Claim 10, after "domain," (first occurrence), insert --providing--

Signed and Sealed this
Fourteenth Day of April, 2020

Andrei Iancu
*Director of the United States Patent and Trademark Office*